Sept. 9, 1930.    G. T. SOUTHGATE    1,775,606
METHOD OF AND APPARATUS FOR COSPATIAL FUEL AND ELECTRIC HEATING
Filed Dec. 30, 1927    4 Sheets-Sheet 1

Inventor:
George T. Southgate,
By Byrnes Townsend & Brickenstein,
Attorneys

Sept. 9, 1930.　　　　　G. T. SOUTHGATE　　　　　1,775,606
METHOD OF AND APPARATUS FOR COSPATIAL FUEL AND ELECTRIC HEATING
Filed Dec. 30, 1927　　　4 Sheets-Sheet 2

Sept. 9, 1930. G. T. SOUTHGATE 1,775,606
METHOD OF AND APPARATUS FOR COSPATIAL FUEL AND ELECTRIC HEATING
Filed Dec. 30, 1927 4 Sheets-Sheet 3

Inventor.
George T. Southgate,
By Byrne Townsend & Brickenstein
Attorneys

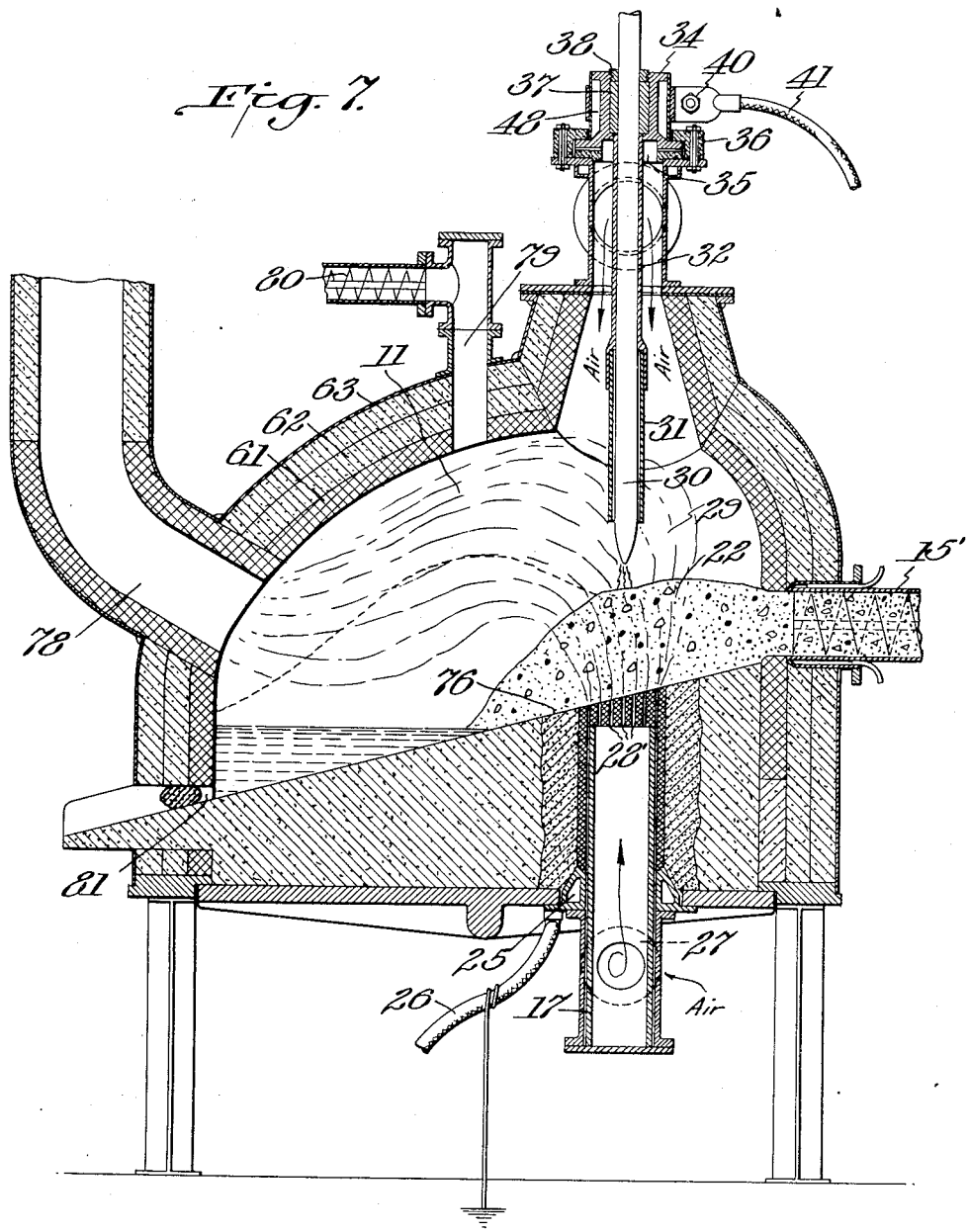

Patented Sept. 9, 1930

1,775,606

UNITED STATES PATENT OFFICE

GEORGE T. SOUTHGATE, OF NIAGARA FALLS, NEW YORK

METHOD OF AND APPARATUS FOR COSPATIAL FUEL AND ELECTRIC HEATING

Application filed December 30, 1927. Serial No. 243,749.

This invention relates to method of and apparatus for co-spatial fuel and electric heating.

In my Reissue Patent No. 16,149 of August 25, 1925, I have described the production of flames and arcs from bodies of carbonaceous material fed to a space to be heated through combined nozzle-electrode structures. The carbonaceous bodies served as fuel material and also as electrodes but no provision was made for extending the carbonaceous material considerably beyond the ends of the nozzles for the purpose of assuring the formation of the arcs entirely from those carbonaceous bodies and never from or closely adjacent the nozzles.

An object of the present invention is to provide improved methods of and apparatus for co-spatial fuel and electric heating by means of electrically conducting bodies which serve both as the fuel and as an electrode. An object is to provide methods of and apparatus for forming a porous body of fuel material within a space to be heated, producing a combustion flame from said body of fuel, and effecting electric conduction between the body of fuel and an electrode. A further object is to provide a method of and apparatus for heating by the joint use of combustive and electric energy, and in which either resistance or arcing heating may be employed at the combustion zone. A further object is to provide a method of and apparatus for ballasting an electric arc, and at the same time preheating a gaseous component of a source of combustive heating with which the arc is associated.

Figure 1:
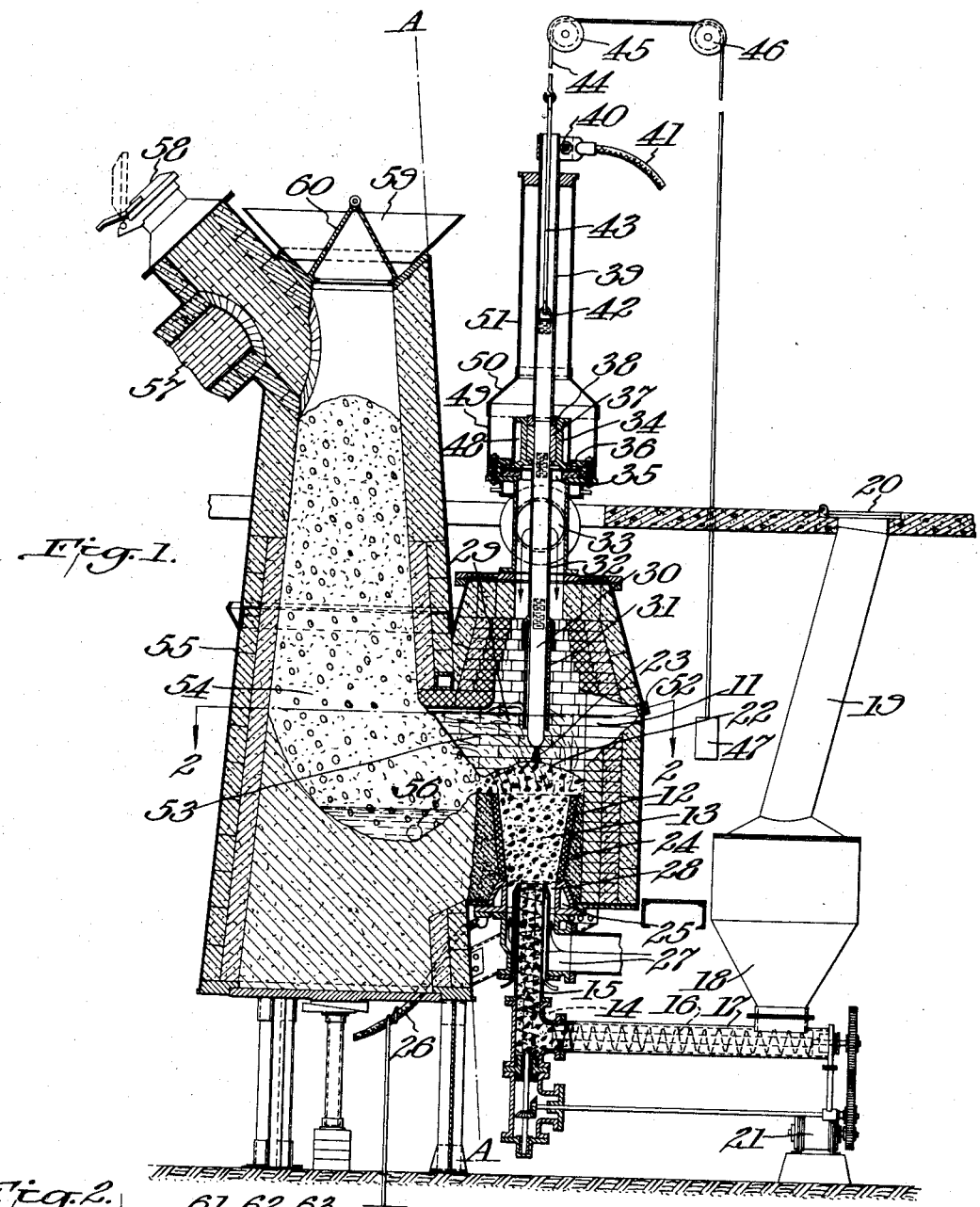
Figure 2:
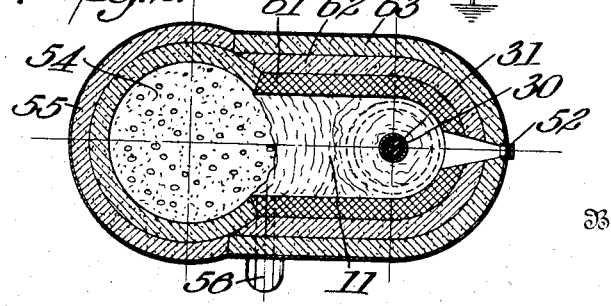
Figure 3:
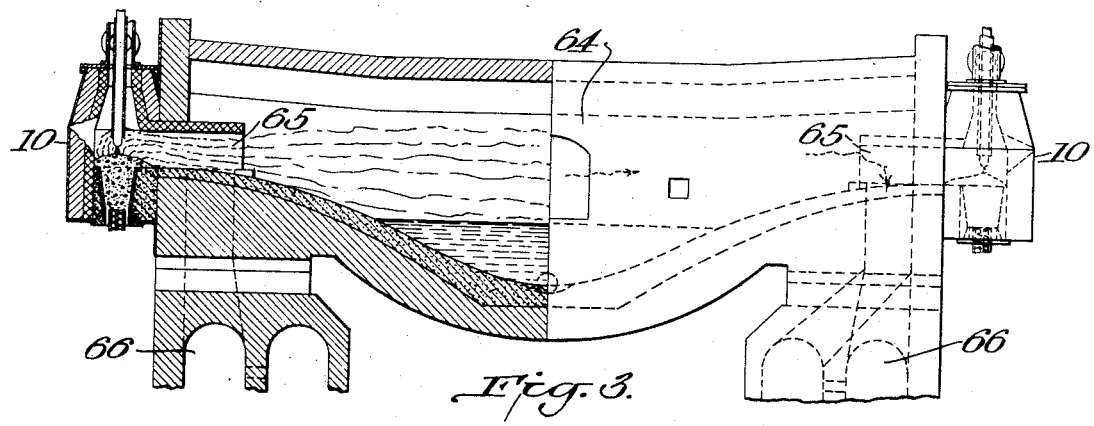
Figure 4:
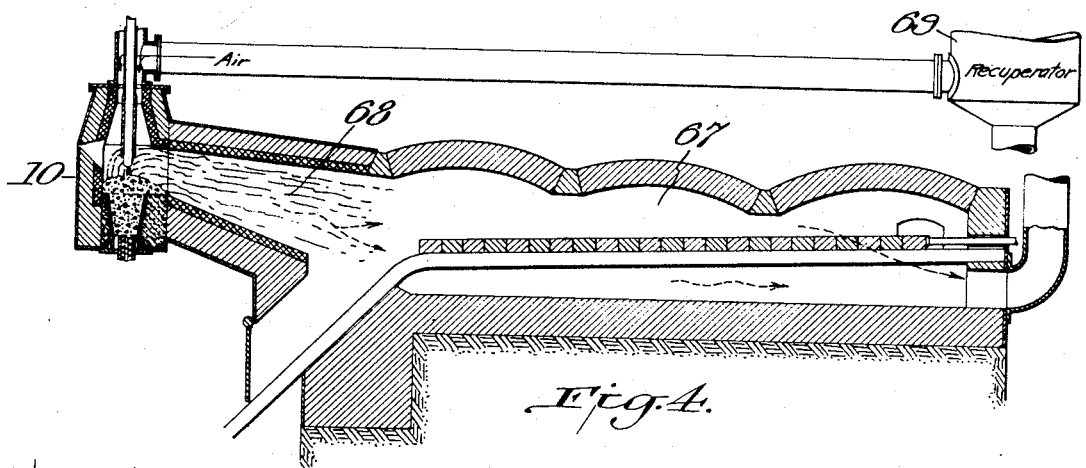
Figure 5:
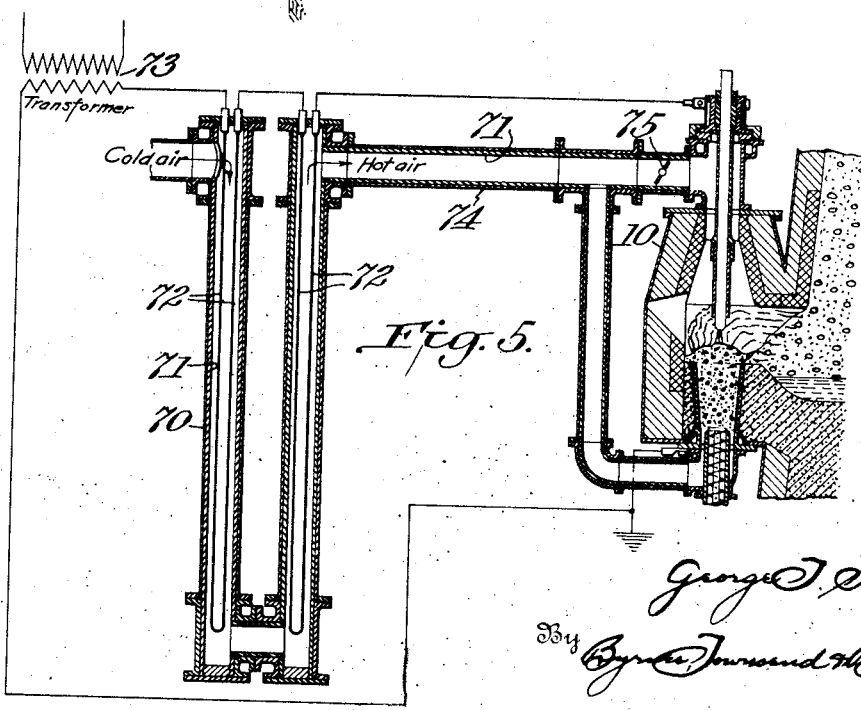

These and other objects of the invention will be apparent from the following specification, when taken with the accompanying drawings, in which Fig. 1 is a vertical midsection of one embodiment of the invention as applied to the heating of the contents of a shaft furnace, Fig. 2 is a horizontal section on the plane 2—2 of Fig. 1, Figs. 3 and 4 are vertical sections, with parts shown in elevation, illustrating the application of the fuel-electric heating apparatus of Fig. 1 to other types of furnaces, Fig. 5 is a fragmentary vertical section of the novel heating apparatus, combined with apparatus for ballasting the arc and preheating a gaseous component of the combustion flame.

Figure 6:
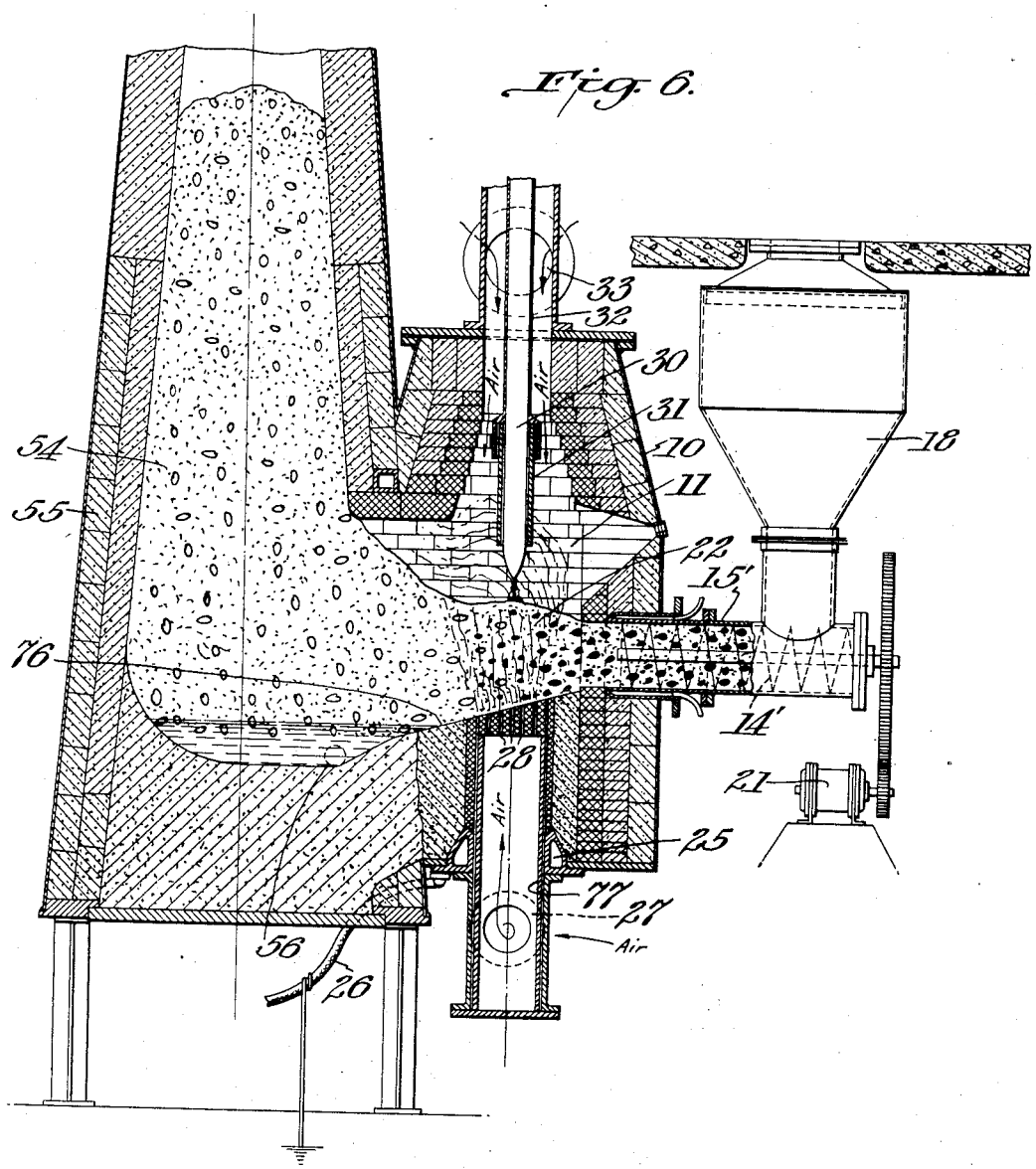

Fig. 6 is a vertical section through a modified form of the invention, the heating apparatus being shown as applied to a shaft furnace, and Fig. 7 is a vertical section through an embodiment of the invention in which the heat-generating and heat-receiving zones of the apparatus are complete in a single chamber.

As will be apparent from the description of the drawings, apparatus embodying the present invention may be complete in itself as a furnace, or may form a heating unit for association with various forms of metallurgical or chemical furnaces.

In Figs. 1 and 2, the apparatus is shown as a heating unit which is mounted at the base of a shaft furnace, the novel construction being shown at the right of the line A—A, and a shaft furnace of conventional design being shown at the left of that line.

The apparatus takes the form of a retort or chamber having a combustion space 11 above a refractory nozzle 12 through which discrete carbonaceous matter 13 is introduced into the chamber to serve both as the fuel and as the arc-consumed or electrode filling of the nozzle. The filling is advanced through the nozzle in any practical manner, as by the slowly driven screw 14 in the casing 15, whose charge is replenished by the other screw 16 contained within the casing 17 which communicates with a hopper 18. When the furnace is operated under pressure considerably above atmospheric this hopper should preferably be closed and may be replenished as by the chute 19 having the tightly fitting cover 20, which is opened only for refilling. The feed screws are driven in any suitable way, as by the motor 21 and appropriate gearing.

The filling 13 rises into the mound 22, which retains an approximately constant form and height as shown and constitutes one of the electrodes or terminals of the arc 23. This mound terminal is preferably connected to the earth; and a convenient method for bringing the electric current from the mound to the grounded side of its source is by way of the conducting packing 24 surrounding the nozzle 12. This packing may be of carbon or graphite, or partly of a refractory material which becomes sufficiently conducting when heated. It may rest upon and thus make good electric contact with a metallic body such as the hollow water-cooled casting 25, which serves as the seat of the nozzle 12. On this casting is terminated the cable 26 connected with the transformer or other source of electric energy. Obviously the grounded side of the circuit need not be brought out in this manner in case the nozzle wall itself is sufficiently conducting, or if other provision is made as by passing the current along the column of filling 13 and through metal parts such as the screw casing 15.

For the burning of the fuel 13 and the generation therefrom of a combustible fume, an oxidizing gas, preferably highly preheated, is introduced into the nozzle 12 via the T 27 which surrounds and is sealed to the screw casing 15. Entry of the oxidant into the nozzle 12 and its fuel content 13 is made through the annular tuyère 28, comprised by the space between the bore of the nozzle and the outside of the water-cooled casing 15 at its upper end. Upon issuing from the fuel-mound 22 the fume burns in the flame 29, which is supplied with secondary air in the manner hereinafter described. In order that the hot oxidant may not injure the casing 15 or cause premature softening of the fuel (such as bituminous coal) and its consequent hanging in the screw, the casing may be hollow and water-cooled, as shown. The oxidant ordinarily thus employed is air; but if it is desired to accelerate the action in the fuel nozzle oxygen-enriched air may be employed, or if a fume rich in fuel value (and in hydrogen) is preferred the air may be partly replaced by steam for the formation of water gas. It is generally advantageous to employ a bituminous coal high in volatile hydrocarbons, in order to raise the calorific value and radiating power of the gases above those from simpler fuels such as coke; and this has the further economy that bituminous coal is ordinarily the cheapest fuel per thermal unit.

The live terminal of the arc 23 is the electrode 30 which may be of carbon, graphite or the like and is preferably formed with threaded ends and connecting pins in order that its stubs may be completely consumed. The electrode is protected from oxidation by the tube 31 of a refractory material such as silicon carbide which surrounds the electrode almost to its working end. In case the protective sleeve is quite long, as here illustrated, we may substitute for silicon carbide a refractory metal tube 32 in the upper portion where the temperature and radiation intensity are not destructive of metal. The silicon carbide sleeve, being thus of a length which may be readily manufactured strong and true to dimensions, may hang from and within the end of the metal tube, as by pins projecting within the belled end thereof.

Secondary air is admitted around the electrode sleeves via the T 33 as shown by the arrows issuing therefrom; and in case this air is very hot the metal tube 32 should preferably be of oxidation-resistant material such as chrome-iron alloy, or of double-walled water-cooled construction of ordinary steel.

The tube 32 hangs from a metal gland box 34 which is in turn supported upon the electrically insulating plate 35 of refractory material. The flange of the gland box 34 may be clamped down by another insulating plate 36 and the entire assembly supported on the upper flange of the T 33 and suitably sealed thereto by gaskets to resist the internal air pressure. The gland box 34 is packed with a suitable elastic medium 37 preferably in ring form; and if it is desired to utilize this material for conducting electric current into the electrode, the packing rings may be made of shredded metal or the like. The packing rings are suitably tightened as by the gland nut 38 which serves also to connect the gland box electrically with the metal guide tube 39 surrounding the external portion of the electrode. This tube has on its upper end a clamp 40 connected with the terminal of the cable 41 by which, via the tube and the gland, the electrode is supplied with current. The upper end of the highest section of electrode is supported by the threaded plug 42 which is in turn hung upon the rod 43. This rod is supported by a suspension rope 44 passing over the sheaves 45 and 46 and balanced by the counterweight 47. When it is desired to shorten the arc or to compensate for consumption of the tip of the electrode it is only necessary slightly to lift the counterweight. When the packing gland is used for the introduction of electric current in the manner here outlined it should preferably be water-cooled as by the jacket 48, which may be supplied and drained by way of rubber hoses of sufficient length to prevent leakage of electric current from the live parts.

Surrounding the entire assembly of live parts and insulated therefrom, there should preferably be a grounded metal casing which is here illustrated in three parts, 49, 50 and 51. The part 50 immediately over the gland is easily lifted for access to the gland nut 38 whenever the packing requires tightening.

In adjusting the length of the arc, observing the condition of the fuel bed and inspecting the general interior of the retort, the sight window 52 is very conveniently employed. It may consist of a pane of glass in a threaded opening in the retort shell, held by two bushings, with suitable gaskets. I have found such a sight window of red glass extremely convenient in operating the furnace, especially if its inner face is cooled and scavenged by a small, continuous stream of compressed air introduced through ports suitably arranged.

The flames or hot gases 29 emanating from the fuel bed 22 are superheated by the electric arc in any desired degree, as determined by the proportion of electric energy supplied. These superheated combustion gases pass from the retort space 11 through the portal 53 and into the charge 54 contained within shaft 55.

In the shaft furnace the superheated gases are obliged to pass through a column of ore or other material which is thereby heated in countercurrent fashion, being initially preheated at the top and finally melted and reduced or otherwise chemically converted at the bottom. The finished and molten material is drawn from the taphole 56 in the usual manner. The spent gases of the combustion, and those which may be derived from chemical actions such as reductions in the raw materials, are removed by way of the exhaust flue 57 and may be employed in the usual manner for recuperative or regenerative preheating of the air used in the furnace. The valve 58 is of the usual type for the relief of explosions or other excess pressure which may occur in emergencies. The raw material is fed into the shaft furnace by means of the usual hopper 59 and bell 60.

As illustrated in Figures 1 and 2, it is desirable to insulate thermally the retort in which the high-temperature heat is generated; and this may be readily accomplished with standard materials. For example the inner lining 61 of the retort may be of silicon carbide, fused magnesia, fused zirconia or other extra-refractory material, and this lining may be backed with fire clay bricks 62 in turn further insulated with bricks 63 of kieselguhr or spongy fire clay. The three thicknesses of such materials are clearly shown in the first two figures.

In Fig. 3, a pair of retorts or heat-generating chambers are employed with a hearth-type furnace for melting and refining operations. The heating units are identified by reference numerals 10, and are substantially identical in construction with the heating unit illustrated in Figs. 1 and 2. The structural details of the Siemens-Martin or open-hearth steel furnace 64 are not important, so far as the present invention is concerned, and may follow any standard or desired practice. The heater units 10 are mounted at opposite sides of the furnace and are alternately operated to deliver superheated combustion gases to the furnace through the portals 65, the gases being then passed from the furnace through the respective regenerators 66.

In Fig. 4, a single heating unit 10 is employed with a continuous heating furnace 67 for annealing or heating billets. The superheated combustion gases enter the heating furnace through portal 68, and the exit gases pass through a recuperator 69 to preheat the oxidizing gas supplied to the heating unit 10.

The electrical circuits which are shown in Fig. 5 indicate preferred operating conditions for carrying out the process. The heating unit 10 embodies the general structural features as described in connection with Figs. 1 and 2. An economical operation of the system both from the fuel combustion and the electrical standpoint is obtained by ballasting the arc with a resistance and employing heat energy developed in the resistance to pre-heat a gaseous component of the combustion flame. When reactors are employed for ballast, the power factor of the system is lowered, and the cost of such reactors is materially higher than that of an ohmic resistance, particularly at the lower frequencies often employed in electric furnaces.

As shown in Fig. 5, the combined ballast and pre-heating system consists of metal pipes 70, preferably lined with refractory material 71 and thermally insulated within which are arranged resistance rods 72 which are in series with the arc and the secondary of the transformer 73. To avoid complicated supports for the resistance members 72, the pipes 70 are preferably arranged as the legs of U-shaped bend formed in the conduit 74 which supplies oxidizing gas to the heating unit 10. The refractory lining 71 is preferably continued through conduit 74 from the heating pipes 70 to the heating unit, the conduit branching, as illustrated, and being provided with a damper 75 for regulating the ratio of primary to secondary air or oxidizing gas.

In Figures 6 and 7 I have illustrated an adaptation of my invention wherein the combined horizontal and vertical fuel-feed screws are replaced by an approximately horizontal one which feeds directly into the side of the retort, but wherein the tuyères for the air or other oxidant remain in about the same relation as the annular one of the previous figures, altered to multiple tubes resembling the tuyères of the Bessemer converter.

In Figure 6, the thus modified fuel-electric heating equipment is shown mounted on a shaft furnace. Obviously it may also be employed with other furnaces as in the examples given for the vertical-screw form in Figures 3 and 4. Figure 7 represents a self-contained furnace, to which separate reference is made in the description of the operation of my process given hereinafter.

In both of these figures, the retort 10 provides a combustion space 11 for the joint combustion-electric heating; and 13 is the fuel introduced by the screw 14' through the water cooled casing 15', from the hopper 18.

The casing 15' here acts directly as the nozzle for the delivery of the fuel onto the hearth extension or refractory shelf 76, which is pierced by the tuyères 28' for the admission of the air or other oxidant of the fuel in the bed 22. These tuyères should preferably be of refractory material sealed through the shelf 76, or of metal pipes in a water-cooled metal block. Primary air reaches the underside of the tuyères through the air pipe 77, supplied in turn via the T 27. Secondary air is supplied through the T 33 surrounding the electrode tube 31 and live electrode 30; the grounded electrode being the fuel mound 22 as in the first figures.

The conducting of the current, arrangement of the sight-hole and other features not separately here explained are substantially the same as in the form shown in the first figures. The side-fed form has a principal distinction that the fused ash of the fuel and any unburned carbon are pushed away from over the tuyères 28'; and when these tuyères are properly proportioned the velocity of the air therethrough prevents any of such fused ash, or of melt from a temporarily overfilled working hearth, from plugging or running through the tuyères.

In Fig. 7, the horizontal feed type of unit shown in Fig. 6, is arranged as a complete furnace, the various elements of the structure being, so far as the novel heating apparatus is concerned, substantially identical with corresponding elements shown in Figs. 1, 2 and/or 6, and being identified by similar reference numerals. Furnaces of this type are particularly useful in conducting operations where no great period of exposure of the stock in the furnace chamber is required.

The walls of the retort are shaped to provide the combustion space 11 through which the electrically superheated combustion gases sweep in passage to the exhaust flue 78. The top of the retort is preferably provided with a chute 79 and feed screw 80 through which the charge may be introduced, and with a tap hole 81 through which molten products may be withdrawn from the retort.

The retort such as shown in Fig. 7 may, of course, be used in carrying out various processes in which high temperature heating is required. The material to be treated, whether solid, liquid or gaseous, may be introduced along with the fuel, and this through the fuel bed into the electrically superheated zone in the retort, or the material may be partly or wholly introduced through the chute 79.

In the operation of my improved process the hopper 18 is supplied with discrete, electrically conducting fuel material which preferably consists of or includes bituminous coal, the fuel feeding equipment is set in motion, the electric switch closed, and the electrode lowered until it makes contact with the top of the fuel bed 22. When the current is established and the fuel bed partly heated thereby, the electrode is raised to a suitable height for the formation and maintenance of the arc and the primary air is blown through the tuyères 28. If the primary air is highly preheated gas-producer action occurs rapidly in the fuel bed, with the formation of carbon monoxide and the distillation of hydrocarbons from the coal. As the fume of these gases issues from the fuel bed, secondary air is admitted around the electrode and regulated for a proper combustion of the gases. The superheated gases then pass over into the working space of the respective type of furnace and heat the stock that is being treated, by passage thereover and therethrough. When operating with a shaft furnace, as in Figures 1 and 2, the primary and secondary air should preferably be supplied by means of a positive-pressure blower, in order that the quantity of air delivered may vary but little with the resistance offered by the stock of material in the shaft, and in order that the shaft may never become impacted with viscous material in case the heating is temporarily interrupted by any cause.

When operated with furnaces for solid ferrometallurgy (annealing, billet or ingot heating, malleableizing, etc., as in Fig. 4) it is preferable to employ coke instead of coal as the fuel in the bed 22, in order that there may be no steam in the combustion gases. It is known that steam has far more oxidizing or scaling action upon steel and iron than has carbon dioxide; and its harmful presence may be thus avoided, and the carbon dioxide minimized by the supplying of only a deficient quantity of secondary air, while the temperature is well maintained at the desired level by the electric super-heating.

If it is desired to operate the furnace at low voltage and large current the electrode may be lowered into light contact with or even full pressure upon the fuel bed 22. If in light contact there will be some degree of arcing at the electrode terminal and among the upper bodies of coked coal in the bed, and if in full contact the arcing will be minimized and the heating mainly Joulean. In either case the electric superheating will be generated principally in the material at the top and middle of the fuel mound and thus removed from the nozzle sufficiently for non-damage to the latter.

When my process and apparatus are operated at comparatively high voltage and with a long arc, the stability of the arc is improved by its approximately vertical position, by the very high heating of the lower electrode from the combustion, and by the movement of the combustively heated gases from the fuel-electrode to the live electrode. The approximately vertical relation of the elements is also convenient for strong construction and easy movement of the upper electrode, as well as for the maintenance of the fuel-electrode mound in gravitational stability.

It will be understood that the steps of the process as well as the arrangement of the apparatus may be varied, without departing from the spirit of my invention.

For example, the operation may be made polyphase, by employing a plurality of electrodes arcing to or in contact with the top of the fuel-electrode, which may then be connected to the circuit neutral. In turn, the fuel mound may be supplied by more than one coal feeder. Instead of screw feeders for the fuel, reciprocating pushers or other means mechanically equivalent in function may be employed. In the form of Figures 6 and 7, part or all of the primary oxidizing gas may be admitted through or around the fuel nozzle, rather than wholly through vertical tuyères under the fuel mound. In this case the approximately horizontal fuel nozzle should preferably be lower beneath the top of the mound than as shown in these figures; and the flow of the gases would not be wholly upward in and from the mound.

I claim:

1. In heating by the joint use of combustive and electric energy, the process which comprises forming a mass of discrete, electrically conducting fuel material at the lower portion of a space to be heated, passing an oxidizing gas upwardly through said mass for effecting combustion of said mass adjacent the upper surface thereof, and passing electric current through the upper portion of said mass to an electrode.

2. The process as set forth in claim 1, wherein said mass is replenished by forcing additional discrete fuel material into said mass at a point below the upper surface thereof.

3. The process of heating by the joint use of combustive and electric energy which comprises forcing discrete, electrically conducting fuel material through a nozzle to form a porous mass within a space to be heated and overlying the inner end of said nozzle, passing an oxidizing gas through said porous mass to establish a combustion flame therefrom, and passing an electric current between the combustion zone of said mass and an electrode positioned in the path of said flame.

4. The process of heating by the joint use of combustive and electric energy, which comprises forcing discrete, electrically conducting fuel material through an opening in the wall of the furnace to form a porous mass overlying the outlet end of said opening, forcing an oxidizing gas through said porous mass to combine therewith to form a flame, and passing current from said mass along said flame to another electrode.

5. In combined combustive electric heating by effecting combustion at the surface of a bed of discrete, electrically conducting fuel material, and passing electric current between an electrode and the upper part of said bed, the method of replenishing said bed of fuel material which comprises supplying additional material thereto at a point below the upper surface thereof.

6. In the process of heating by the joint use of combustive and electric energy, the method of protecting a nozzle through which discrete electrically conducting fuel material and an oxidizing gas are passed to a burning fuel bed which serves as one electrode of the electric heating circuit, which comprises maintaining a layer of said fuel material over the inner end of said nozzle.

7. In combined combustive and electric heating, the process which comprises forcing discrete, electrically conducting fuel material and an oxidizing gas into a porous mass of fuel below the upper surface thereof, arranging an electrode above said porous mass, and impressing an electrical potential between said mass and said electrode to effect electric conduction therebetween.

8. The process as set forth in claim 7, wherein the mass of fuel material is maintained at ground potential and the active potential is applied to said electrode.

9. In combined combustive and electric heating, the process of stabilizing the arc and preheating the oxidizing gas which supports combustion, which comprises passing current to the arc through a resistance, and passing the said oxidizing gas in heat-transfer relation to said resistance.

10. In apparatus for combined combustive and electric heating, walls defining a combustion space, said walls having an opening therethrough at the lower portion of said space, means for forcing discrete electrically conducting fuel material through said opening to form a porous mass in said space, means for passing an oxidizing gas through said mass and into said space, an electrode projecting downwardly through the space above said mass, and means for effecting electric conduction between said mass and said electrode.

11. In apparatus for combined combustive and electric heating, a chamber having a combustion space, means for introducing discrete, electrically conducting material into said chamber to form a porous mass therein, an electrode projecting into said chamber and towards said mass, means for passing an oxidizing gas through said mass to combine therewith to form a flame within said combustion space, and means for effecting electric conduction between said electrode and said porous mass.

12. The invention as set forth in claim 11, wherein said means for introducing fuel material into said chamber replenishes said porous mass by forcing additional material into the same below the upper surface thereof.

13. The invention as set forth in claim 11, wherein the said electrode is so positioned that the zone of electric conduction coincides with the region of most intense combustion.

14. In electric heating apparatus, a chamber having a combustion space therein, a nozzle extending through a wall of said chamber at the bottom thereof, means for forcing discrete, electrically conducting fuel material through said nozzle to form a porous mass within said chamber, means for passing an oxidizing gas through said mass to effect combustion at the top thereof, an electrode extending towards said mass from the top of said chamber, and means for effecting electric conduction between said electrode and the combustion zone of said mass.

15. The invention as set forth in claim 14, wherein the walls of the chamber adjacent the inner end of said nozzle are so shaped that the said porous mass overlies the inner end of said nozzle.

16. In apparatus for combined combustive-electric heating, a chamber having a combustion space therein, a porous mass of discrete, electrically conducting fuel material in said chamber, means for forcing an oxidizing gas through said mass to combine therewith to form a flame stream in said combustion space, an electrode in said flame stream, and means for impressing upon said electrode an electrical potential effective to cause arcing conduction therefrom to said mass and in said flame stream.

17. In heating apparatus, a chamber having walls defining a combustion space and a space for supporting a porous mass of electrically conducting fuel material, means for forcing an oxidizing gas into said chamber through said mass to initiate combustion in a zone adjacent the exposed surface of said mass, an electrode having an inner end terminating adjacent said zone, and means for effecting electric conduction between said electrode and the upper portion of said mass.

18. The invention as set forth in claim 17, wherein the surface of said electrode is provided with a covering of refractory oxidation resistant material, and means is provided for introducing additional oxidizing gas into said space along said electrode.

19. In apparatus for combined combustive and electric heating, a chamber defining a fuel space and a combustion space, means for introducing solid electrically conducting fuel material and an oxidizing gas into said fuel space to form combustion flames in said combustion space, an electrode having an inner end positioned to effect arcing conduction to the fuel material in said fuel space, a source of current, resistances in series in the circuit established between said source, electrode and fuel material, and means for passing the oxidizing gas in heat transfer relation to said resistance to pre-heat said gas.

20. The invention as set forth in claim 19, wherein said resistance has the form of an elongated conductor positioned within a pipe through which the said oxidizing gas is passed to said chamber.

In testimony whereof, I affix my signature.

GEORGE T. SOUTHGATE.